United States Patent [19]
Gebben

[11] Patent Number: 5,989,697
[45] Date of Patent: Nov. 23, 1999

[54] COPOLYETHER AMIDE AND WATER VAPOR PERMEABLE FILM MADE THEREFROM

[75] Inventor: Bert Gebben, Velp, Netherlands

[73] Assignee: Akzo Nobel, NV, Arnhem, Netherlands

[21] Appl. No.: 08/976,803

[22] Filed: Nov. 24, 1997

Related U.S. Application Data

[62] Division of application No. 08/699,004, Aug. 16, 1996, Pat. No. 5,744,570.

[30] Foreign Application Priority Data

Aug. 17, 1995 [NL] Netherlands ............................. 1000996

[51] Int. Cl.$^6$ ............................ B32B 3/26; B32B 27/08
[52] U.S. Cl. ............................ 428/315.5; 428/317.1; 428/474.4; 526/71; 525/408; 525/430; 525/423; 525/437; 524/104; 524/505; 524/608; 528/288; 528/70; 528/310; 528/323; 528/287; 528/282; 528/328; 528/326; 528/272
[58] Field of Search ................ 428/315.5, 317.1, 428/474.4; 526/71; 525/408, 430, 423, 437; 524/104, 505, 608; 528/288, 70, 310, 323, 297, 282, 328, 326, 272

[56] References Cited

U.S. PATENT DOCUMENTS

| | | | |
|---|---|---|---|
| 2,071,250 | 2/1937 | Carothers | 526/71 |
| 2,071,253 | 2/1937 | Carothers | 528/310 |
| 2,130,948 | 9/1938 | Carothers | 15/159.1 |
| 3,968,183 | 7/1976 | Hayashi et al. | 524/505 |
| 4,808,675 | 2/1989 | Twilley et al. | 525/408 |
| 5,506,024 | 4/1996 | Flesher | 428/85 |
| 5,744,570 | 4/1998 | Gebben | 528/170 |

FOREIGN PATENT DOCUMENTS 378015  1/1995  European Pat. Off. ............ C08J 5/18

OTHER PUBLICATIONS

"Film Materials", Kirk–Othmer Encyclopedia of Chemical Technology, vol. 9, pp. 232–241 (1966).

*Primary Examiner*—Leszek Kiliman
*Attorney, Agent, or Firm*—Oliff & Berridge, PLC

[57] ABSTRACT

Claimed is a copolyether amide having a melting point in the range of 180° to 260° C., incorporating at least 10 wt. % and not more than 30 wt. % of ethylene oxide groups, and composed of 30 to 60 wt. % of polyamide segments and 70 to 40 wt. % of segments derived from a (cyclo)aliphatic or aromatic dicarboxylic acid or a dimeric fatty acid and a polyoxyalkylene diamine derived from a polyoxyalkylene group having a molecular weight of 600 to 6000 and an atomic ratio of carbon to oxygen of 2.0 to 4.3. Also claimed is a non-porous, waterproof film having a water vapor permeability of at least 1000 g/m$^2$ day determined at 30° C. and 50% RH in accordance with ASTM E96-66 which is based on a the use of these films in rainwear, shoes, tents, chairs, as mattress covers and underslating, for medical purpose garments, and for the manufacture of dressings.

15 Claims, No Drawings

COPOLYETHER AMIDE AND WATER VAPOR PERMEABLE FILM MADE THEREFROM

This is a divisional of application Ser. No. 08/699,004 filed Aug. 16, 1996 now U.S. Pat. No. 5,744,570.

The invention pertains to a copolyether amide which is composed of polyamide segments A and ethylene oxide groups-containing polyamide segments B, the polyamide segments A comprising monomer units of the following structure:

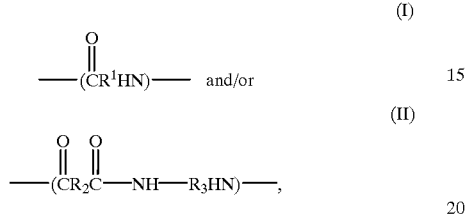

wherein $R_1$ has the meaning of an alkylene group with 3 to 11 carbon atoms which may be substituted or not, and $R_2$ and $R_3$ may be the same or different and represent a (cyclo)alkylene group with 4 to 11 carbon atoms which may be substituted or not or a difunctional aromatic group, and the polyamide segments B comprising monomer units of the following structure:

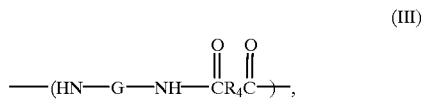

wherein G stands for a divalent group remaining after the removal of the amino terminated groups of a polyoxyalkylene diamine which is connected or not via one or more lactam units included among the polyamide segments A according to the former formula with a dicarboxylic acid unit wherein $R_4$ has the meaning of a (cyclo)alkylene group which may be substituted or not, a polyoxyalkylene group or a difunctional aromatic group, and to a non-porous, waterproof film made therefrom which has a water vapour permeability of at least 1000 g/m² day determined at 30° C. and 50% RH in accordance with ASTM E96-66, and the use of such films in rainwear, tents, as mattress covers, underslating for roofing, in waterproof shoes, in waterproof, water vapour permeable chair covers, more particularly for car seats, in medical purpose garments, and in dressings.

Copolyether amides of the aforesaid composition and non-porous, waterproof films made therefrom having a water vapour permeability of at least 1000 g/m² day are known from U.S. Pat. No. 4,808,675. Although waterproof films having a high water vapour permeability can be made from the copolyether amides prepared in the examples of this patent publication, these films were found to have a large number of shortcomings with regard to practical use.

On reworking of the examples of this patent publication it was found not only that films made of copolyether amides with 2 to 22 wt. % of polyether incorporated therein displayed a permanent plastic deformation which was objectionably high for application in textiles, but also that films made from these copolyether amides when subjected to the least mechanical load made a crackling noise very similar to the noise created when cellophane film is deformed. Clearly, these are not the sort of properties to encourage the skilled person to examine the polymers described in the aforesaid U.S. patent specification more closely for their potential suitability for use in textiles.

The invention now proposes copolyether amides from which films can be made which not only possess waterproofness and high water vapour permeability, but also are wholly or for the most part without the drawbacks of the known copolyether amides and the films made therefrom.

The invention consists in that the copolyether amide of the known type mentioned in the opening paragraph a) is made up of at least 10 wt. % and not more than 30 wt. % of ethylene oxide groups, b) is composed of 30 to 60 wt. % of polyamide segments A and 70 to 40 wt. % of polyamide segments B containing the monomer units according to formula (III), wherein G has the meaning of a polyoxyalkylene group having a molecular weight of 600 to 6000 and an atomic ratio of carbon to oxygen of 2.0 to 4.3, or when the group $R_4$ has the meaning of a divalent group obtained after the removal of the carboxyl groups, of a dimeric fatty acid or of a polyoxyalkylene group having a molecular weight of 600 to 6000 and an atomic ratio of carbon to oxygen of 2.0 to 4.3, as well as of a (cyclo)alkylene group with 2 to 12 carbon atoms which may be substituted or not or of a difunctional aromatic group, and c) has a melting point in the range of 180 to 260° C.

It should be noted that EP-B-378 015 also describes copolyether amides from which water vapour permeable films can be made. However, these are copolyether ester amides, with the polyether linked to the polyamide via an ester group. The disadvantage of these polymers is their susceptibility to hydrolysis. In order to obtain films having an acceptably high water vapour permeability use is made of copolyether ester amides based on polyethers incorporating ethylene oxide groups. A drawback to polymers of this type is their high water absorption. To restrict it, preference is given to copolyether ester amides based on polyamide-12 or polyamide-6,12. While the water absorption of a copolyether ester amide based on 50 wt. % of polylaurolactam (PA 12) and polyethylene oxide glycol (PEG) is 48 wt. % (after 24 hours' immersion at 23° C.), an unacceptably high water absorption of 120 wt. % is reported for a comparable composition based on polycaprolactam (PA 6). However, copolyether ester amides based on PA 11 or PA 12 suffer from the drawback of having a melting temperature which is substantially lower than the melting temperature of copolyether ester amides based on PA 6. Hence the use of copolyether ester amides based on PA 11 or PA 12 may cause problems when manufacturing, say, rainwear or tents due to the high temperatures occurring when the tape for sealing the seams is put on. Likewise, steam sterilising films based on polymers with a melting temperature <<180° C. may produce products of greatly reduced stability.

For these reasons it has to be deemed extremely surprising that the drawbacks attendent on the use of the above-discussed copolyether amides or copolyether ester amides known from the prior art and the films manufactured therefrom are absent entirely or for the most part when use is made of copolyether amides of the now proposed composition.

According to the invention, preference is given to the use of a copolyether amide having a melting point in the range of 190 to 240° C. Further preference is given to a copolyether amide having a percentage of ethylene oxide groups in the range of 15 to 25 wt. %.

Optimum results are generally obtained when employing a polymer composition with a concentration of the polyamide segments A in the copolyether amide in the range of 40 to 50 wt. %. The best results so far in that case have been achieved using a polyoxyalkylene diamine wherein the molecular weight of group G ranged from 1000 to 4000.

The polyamide segments A may be made up of one or more monomers, e.g., γ-butyrolactam, δ-valerolactam, ε-caprolactam, enantolactam, ω-lauryllactam, caprilactam, etc. Preferably, use is made in that case of ε-caprolactam, referred to as caprolactam hereinafter. In addition to one or more of the aforementioned lactams may be employed various combinations of diamines and dicarboxylic acids. When combining different lactams and/or diamines and dicarboxylic acids to form a mixture, it should always be taken into account that the melting point of the (co)polyether amide formed therefrom is in the range of 180 to 260° C. If the melting temperature is lower than 180° C., problems such as those mentioned before may manifest themselves in the long run. At a melting temperature >260° C. there is a risk of decomposition in particular, which is revealed, int. al., by a reduced viscosity. This may lead to the products made therefrom having a reduced stability among other things.

Examples of eligible diamines according to the invention are: tetramethylene diamine, hexamethylene diamine, diaminocyclohexane, 4,4'-diaminodicyclohexylene diamine, isophorone diamine, and 1,4-bisdiaminomethyl cyclohexane.

Examples of suitable dicarboxylic acids are adipic acid, sebacic acid, terephthalic acid, isophthalic acid, 2,6-naphthalene dicarboxylic acid, and cyclohexane dicarboxylic acid, with preference being given to the use of polyamide-6,6 and/or polyamide-6,12. It is also possible to use combinations of copolymers made of a lactam and salts of a diamine containing a dicarboxylic acid. Especially important are copolymers of caprolactam and polyamide-6,6, with preference being given to compositions made up of caprolactam incorporating up to a maximum of 30 wt. % of polyamide-6,6, or to compositions made up of polyamide-6,6 incorporating up to a maximum of about 40 wt. % of caprolactam.

It was found that films having good properties are obtained when the polyamide segments B are formed of a diamine of the formula:

(IV)

$$H_2N-(CH_2)_{\overline{y}}-(OR^2)_{\overline{x}}-NH_2,$$

wherein x is an integer from 1 to 100, y is an integer from 1 to 20, $R^1$ has the meaning of a hydrogen atom or an alkyl group with 1 to 4 carbon atoms, and $R^2$ represents an alkylene group with 2 to 4 carbon atoms. Very fine results are achieved using copolyether amides of which the segments B are obtained from a diamine of the formula:

(V)

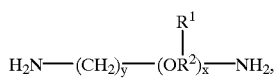

wherein n is 25 to 40 and/or a diamine of the formula:

(VI)

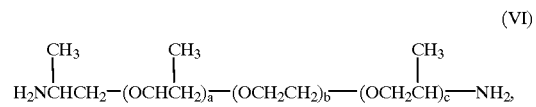

wherein c stands for at least 1, (a+c) is at least 1, but less than 6, and b represents at least 10, but not more than 90.

Preference is given in this case to a copolyether amide film where in the preparation of the copolyether amide use is made of a diamine according to formula (V) wherein n=30 to 40, and of a diamine according to formula (VI) wherein a+c=1 to 6, and b=35 to 45. Optimum results were obtained using a diamine of formula (V) where n=±33, and a diamine of formula (VI) where a+c=±5.5, and b=±37.5.

$R_4$ in formula (III) may have widely varying meanings. Using an unsaturated dicarboxylic acid or a dicarboxylic acid having a functional group such as malic acid makes it possible to incorporate functional groups into the polymer. This may be of relevance when the copolyether amides are used to make self-adhesive films, which may be of advantage when manufacturing laminates.

In principle, favourable results can also be achieved when the polyether-forming groups are part of the group $R_4$. For instance, the group $R_4$ may also be a polyalkylene oxide built up wholly or in part of ethylene oxide groups.

In view of UV-stability preference is given to a group derived from a (cyclo)aliphatic dicarboxylic acid, wherein $R_4$ has the meaning of a tetramethylene or cyclohexylene group.

It was found to be advisable for a number of applications that the water absorption of the films be restricted to a minimum.

Surprisingly, it was found that when in formula (III) $R_4$ has the meaning of a group derived from a dimeric fatty acid with at least 36 carbon atoms, the water absorption can be reduced to a level of less than 50 wt. %. Preference is given in this case to a composition where the dicarboxylic acid of the formula $R_4(COOH)_2$ is a dimeric fatty acid with 44 carbon atoms.

For the preparation of the copolyether amides according to the present invention reference may be had to U.S. Pat. Nos. 2,071,250, 2,071,253, and 2,130,948. These describe the preparation of fibre- and film-forming polyamides, such as polyhexamethylene adipamide, polycaproamide, polytetramethylene adipamide, polypentamethylene adipamide, polyheptamethylene adipamide, polyheptamethylene pimelamide, polyoctamethylene adipamide, polynonamethylene adipamide, polyhexamethylene sebacamide, polyamide composed of polypyrrolidone, polyamide composed of 11-amino-undecanoic acid, polyamides derived from terephthalic acid or isophthalic acid and hexamethylene diamine or meta- or para-phenylene diamine. The copolyether amides according to the invention usually are prepared analogously, the procedure commonly being as follows. First, the monomer to be polymerised, preferably caprolactam, is added beforehand to a nitrogen atmosphere containing a small quantity of ε-aminocaproic acid or monomers such as adipic acid and hexamethylene diamine, after which the dicarboxylic acid and an equimolar quantity of the polyoxyalkylene diamine are added. Following flushing with nitrogen, the reaction mixture is then heated to a temperature in the range of 190 to 270° C. over a period of 4 to 20 hours. Generally, the polymerisation reaction is carried out in the presence of a heat stabiliser such as 1,3,5-trimethyl-2,4,6-tris[3,5-di-tert.butyl-4-hydroxybenzyl]-benzene and/or N,N'-

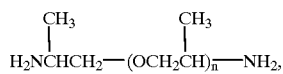

hexamethylene-bis(3,5-di-tert.butyl-4-hydroxycinnamamide). In order to prevent the products being exposed to high temperatures for too long periods of time, which may result in potentially irreversible thermal decomposition, a catalyst may be employed if so desired. Frequently employed catalysts are phosphoric acid and hypophosphorous acid. The polymerisation reaction usually is carried out until the resulting copolymer has a relative viscosity (measured on a solution of 1 g of polymer in 100 g of m-cresol of 25° C.) of at least 2,0, but preferably >2,4 though <2,8, after which the molecular weight is increased further to a value in the range of 3 to 4 by post-condensation in the solid state.

When use is made of a polyoxyalkylene diamine having a molecular weight <600, a prohibitively large number of its moles have to be incorporated into the copolyether amides, resulting in polymer from which films having satisfactory physical properties cannot be made. Nor is it possible to make films having acceptable physical properties from copolyether amides prepared with a polyalkylene oxide diamine having a molecular weight of over 6000.

The manufacture of films from copolyether amides according to the present invention is carried out in a manner known in itself from the prior art, as described in Kirk-Othmer, *Encyclopedia of Chemical Technology* 9 (1966), pp. 232–241. Films having a thickness of 5 to 35 μm can be obtained by means of blow moulding.

However, preference is given to flat films produced by flat die extrusion on a chill roll. The roll temperature selected in this case preferably is in the range of 75 to 185° C., as described in U.S. Pat. No. 3,968,183. In order to prevent the film sticking to the chill roll, mostly a non-blocking agent such as microtalc, micro-mica and/or silica is employed, e.g. diatomaceous earth.

If the main thing is the manufacture of laminates, it is also possible to use extrusion coating, in which process the laminate and the film are formed simultaneously.

Alternatively, films can be obtained from aqueous dispersions of copolyether amides according to the present invention. These dispersions are prepared as follows: first, a solution is made of the copolyether amide in N-methyl pyrrolidone and this solution is poured into water into which there is also incorporated, if so desired, an anti-solvent which preferably is at least partially water-miscible, optionally followed by the whole or partial replacement of the aqueous phase with water. Suitable water-miscible organic anti-solvents include one or more compounds from the group of ethanol, isopropyl alcohol, methoxypropoxy propanol, isobutoxy propanol, and acetone. However, preference is given to a method which does not employ any anti-solvent at all.

Needless to say, the degree of water vapour permeability of films made of the copolyether amides according to the invention is dependent not only on the composition of the copolyether amide, but also on the thickness of the film. Generally speaking, water vapour permeable films should meet the requirement of a water vapour permeability of at least 1000 g/m$^2$ day.

It was found that, in general, very favourable results are attained when the copolyether amides according to the invention are made into films having a thickness ranging from 5 to 35 μm. Optimum results are generally attained when the polymer film's thickness ranges from 5 to 20 μm.

For the manufacture of waterproof rainwear or tents from copolyether amide films according to the present invention very favourable results are attained using flat die extruded or blow moulded copolyether amide films which at 23° C. in water in accordance with DIN 53495 display a water absorption of not more than 75 wt. %, calculated on the weight of the dry films.

Preference is given in this case to polymers where the films made therefrom absorb not more than 55 wt. % of water.

Films made from the copolyether amide films according to the invention were also found to be highly suitable for manufacturing waterproof and water vapour permeable seat covers, more particularly car seats.

Another important use of films made of copolyether amides according to the invention is the manufacture of waterproof but breathing shoes, more particularly sports shoes.

A further possible use for films made of the copolyether amides according to the invention is the manufacture of mattress covers. While it is true that the known mattress covers made of water vapour permeable films based on copolyether esters have a high water vapour permeability, they are not suitable for multiple use on account of the copolyether ester films' too low resistance to hydrolytic degradation on repeated steam sterilisation, and hence too expensive for use in hotels, hospitals, and the like. The known films based on copolyether ester amides are not suitable for such use either, not only because of the presence of an easily hydrolysable ester group, but also because of the too low melting point of the commercially available films made of these polymers.

The resistance of the present polymers to degradation under the influence of UV-light as well as to thermal decomposition renders the copolyether amide films made therefrom pre-eminently suitable for use in underslating.

Another important use made feasible with the films made of the copolyether amides according to the invention is their manufacture into medical purpose garments. The continuity of the film material means that bacteria or viruses cannot penetrate it, eliminating the risk of contamination. Because of the material's high water vapour permeability garments or gloves made out of it will feel comfortable to wear. A major advantage over the materials available so far is that garments made out of it can be re-used several times after sterilisation without any appreciable deterioration of the film properties, which may lead to substantial savings in this sector.

Finally, it is to be noted that films made from the present copolyether amides can be used to make dressings. It is even possible to obtain disinfecting dressings, by first soaking the films in an aqueous solution of chlorohexidine.

The invention will be further elucidated with reference to the following examples. The scope of the invention, however, is not restricted to the specific details of the examples.

The following methods were used to determine the properties of films and/or waterproof garments made from the copolyether amides according to the present invention.

A. Determination of water absorption in water at 23° C. in accordance with DIN 53495.

B. Determination of water vapour permeability, WVP1, at 30° C. and 50% RH in accordance with ASTM E96-66 (Procedure B).

C. Determination of modified water vapour permeability, WVP2, as under B, with the proviso that the water temperature is kept at 30° C. as with the measurement of WVP1, while the ambient temperature is 21° C. at 60% RH.

D. Determination of waterproofness at an excess pressure of 80 kPa on a gauze wholly covered with the film to be examined, with water present on either side.

E. Determination of permanent plastic deformation, PPD, in accordance with the following method:

Stretched in a draw bench is a 25 mm wide membrane with a gauge length of 50 mm. The strip is elongated 100% at a rate of 100% per minute, which for the aforementioned gauge length corresponds to 50 mm/min. Following elongation the clip returns to the initial state. After a wait of 5 minutes a second cycle is started. The second curve shows the permanent plastic deformation, which is expressed by the percentage permanently elongated.

EXAMPLE I

A mixture composed of 10 kg of a poly(ethylene oxide) containing 2-aminopropyl terminated groups and having a molecular weight of about 2000 (Jeffamine ED2001, ex Huntsman), 10 kg of a poly(propylene oxide) containing 2-aminopropyl terminated groups and having a molecular weight of about 2000 (Jeffamine D2000, ex Huntsman), 1384 g of adipic acid, 30 kg of ε-caprolactam, 250 g of stabiliser Irganox 1330 (ex Ciba Geigy) of the formula 1,3,5-trimethyl-2,4,6-tris[3,5-di-t-butyl-4-hydroxybenzyl] benzene, 125 g of 85% phosphoric acid, and 500 g of micro mica (W160 ex Norwegian Talc) were subjected to a polycondensation reaction for 6 hours under a nitrogen atmosphere at 250° C. On conclusion of the reaction the reaction product was rapidly cooled by extrusion in water, after which it was chopped up into a granulate, which was washed with water of 90° C. for 12 hours to remove unconverted caprolactam and other low-molecular weight products. Next, the polymer was dried and subjected to a post-condensation in the solid state for 20 hours at 176° C. and a pressure of 3 mbar. The relative viscosity ($\eta_{rel}$) of the resulting copolymer was 3.63 (measured on a solution of 1 g of polymer in 100 g of m-cresol of 25° C.) and contained 46.5 wt. % of polyether amide segments (determined by NMR). The weight percentage of ethylene oxide (EO) was determined to be 20.5. The water absorption was 57 wt. % (determined after 48 hours' immersion in distilled water of 25° C.).

EXAMPLE II

Comparative Example

In a manner analogous to that indicated in Example I a copolyether amide was prepared, with the proviso that this time for the polyether amine exclusive use was made of 4030 g of a poly(ethylene oxide) containing 2-aminopropyl terminated groups and having a molecular weight of about 2000 (Jeffamine ED2001). To this were added 303 g of purified terephthalic acid, 6000 g of ε-caprolactam, 50 g of Irganox 1330, and 26.6 g of 85% phosphoric acid. The polycondensation reaction continued for 4.75 hours. Post-condensation lasted 5 hours at 174° C. The $\eta_{rel}$ of the resulting copolymer was 3.81. The polyether amide segments content was 46.6 wt. % (determined by NMR). The weight percentage of ethylene oxide (EO) was determined to be 39.5. The water absorption this time was 98 wt. %. The swelling behaviour of film made therefrom was unacceptable for most applications.

EXAMPLE III

In a manner analogous to that indicated in Example I a copolyether amide was prepared, with the proviso that this time use was made of 12.5 kg of Jeffamine ED2001, 12.5 kg of Jeffamine D2000, 1730 g of adipic acid, 25 kg of ε-caprolactam, 250 g of Irganox 1330, 125 g of 85% phosphoric acid, and 500 g of microtalc. The polycondensation reaction this time took 17 hours under a nitrogen atmosphere at 250° C. The washed granulate was then dried and subjected to a post-condensation in the solid state for 50 hours at 189° C. and 3 mbar.

The $\eta_{rel}$ of the resulting copolymer was 3.20. NMR was used to determine a polyether amide weight percentage of 56.5. The water absorption was 75 wt. %. The weight percentage of ethylene oxide (EO) groups was determined to be 24.5.

EXAMPLE IV

Comparative Example

In a manner analogous to that indicated in Example III a copolyether amide was prepared, with the proviso that this time use was made of a mixture-of 5019.5 g of Jeffamine ED2001, 377.5 g of purified terephthalic acid, 5000 g of ε-caprolactam, 50 g of Irganox 1330, and 26.6 g of 85% phosphoric acid. The polycondensation reaction this time took 6.75 hours. The post-condensation in the solid state lasted 2.5 hours at 174° C.

The $\eta_{rel}$ of the resulting copolymer was 3.41. NMR was used to determine a weight percentage of polyether amide of 56.6. The water absorption was 145 wt. %. The weight percentage of ethylene oxide (EO) groups was determined to be 48.5. The swelling behaviour of film made therefrom was unacceptable for most applications.

EXAMPLE V

The copolymers prepared in line with Examples I through IV were extruded at a temperature in the range of 240 to 250° C. into flat, 20 μm thick films. The properties measured on these films are listed in Table 1.

TABLE 1

| Polymer example | Jeffamine ED2001 | Jeffamine D2000 | water absorption | WVP2 g/m² 24 h. | Waterproofness g/m² 24 h. |
|---|---|---|---|---|---|
| I | 20 | 20 | 57 | 2936 | 206 |
| II | 40 | — | 98 | 3043 | 2683 |
| III | 25 | 25 | 75 | 3161 | 460 |
| IV | 50 | — | 145 | 3228 | >5000 |

The results listed in the table above clearly show that only the copolyetheramide compositions of Examples I and III will lead to waterproof films.

EXAMPLE VI

Using a glue based on a polyether urethane (ex UCB) in a 50 wt. % solution of methylethyl ketone, the films of Example V were laminated against a polyamide fabric (112 g/m²) with the aid of an engraved roller. The films according to the present invention were readily laminatable into laminates having satisfactory grip. The waterproofness of laminates with films made of copolyether amide containing only the hydrophilic Jeffamine ED2001 was insufficient. The outcome of the measurements is listed in Table 2.

TABLE 2

| Polymer example | Jeffamine ED2001 wt. % | Jeffamine D2000 wt. % | WVP2 g/m² 24 h. | Waterproofness g/m² 24 h. |
|---|---|---|---|---|
| I | 20 | 20 | 2438 | 619 |
| IV | 50 | — | 3313 | >5000 |

The results listed in Table 2 clearly show that films made of a copolyether amide containing 50 wt. % of Jeffamine ED2001 (48.5 wt. % of ethylene oxide groups, calculated on the copolyether amide) are not waterproof.

EXAMPLE VII

Comparative Example

In a manner analogous to that indicated in Example I a copolyether amide was prepared, with the proviso that this time for the polyether amine exclusive use was made of 13.13 kg of a poly(ethylene oxide) containing 2-aminopropyl terminated groups and having a molecular weight of about 2000 (Jeffamine ED2001). To this were added 833.4 g of adipic acid, 36 kg of ε-caprolactam, 250 g of Irganox 1330, and 133 g of 85% phosphoric acid. The polycondensation reaction in a batch autoclave under nitrogen lasted 2 hours and 10 minutes at 255° C. Following extrusion in a water bath the polymer was chopped up into a granulate, which was washed with water for 3 hours at 90–95° C. After being dried the granulate was subjected to a post-condensation in the solid state for 2 hours at 176° C. The $\eta_{rel}$ of the resulting copolymer was 3.79. The content of polyether amide segments was 29.3 wt. % (determined by means of NMR). The weight percentage of ethylene oxide groups was determined to be 26.4. The water absorption this time was 50 wt. %.

This polymer was extruded into a 17–18 μm thick film. After 100% elongation a permanent plastic deformation (PPD) was measured. The outcome of this measurement, and that on films according to Examples I and III, is listed in Table 3.

TABLE 3

| Polymer example | Jeffamine ED2001 wt. % | Jeffamine D2000 wt. % | PPD % |
|---|---|---|---|
| I | 20 | 20 | 21 |
| III | 25 | 25 | 15 |
| VII | 28 | — | 39.4 |

The results listed in Table 3 clearly show that films made of a copolyether amide according to the invention exhibit a significantly lower permanent plastic deformation than do copolyether amide films with a low content of polyether amide segments B according to the prior art.

EXAMPLE VIII

In a manner analogous to that indicated in Example I a copolyether amide was prepared, except that this time use was made of 1498 g of Jeffamine ED2001, 2502 g of Jeffamine D2000, 278.5 g of adipic acid, 6000 g of ε-caprolactam, 50 g of Irganox 1330, 25 g of 85% phosphoric acid, and 100 g of microtalc. The polycondensation reaction took 6 hours under a nitrogen atmosphere at 250° C. The reaction product was cooled down rapidly in water and chopped up into a granulate, which was washed for 12 hours with water of 90° C. in order to remove unconverted caprolactam and other low-molecular weight constituents. The washed granulate was then dried and subjected to a post-condensation in the solid state at 175° C. for 24 hours. The $\eta_{rel}$ of the resulting copolymer was 3.34. NMR was used to determine a weight percentage of polyether amide of 44. The content of ethylene oxide groups in the copolyether amide was 14 wt. %. The water absorption was 38 wt. %. The thus obtained copolyether amide was made into a 20 μm thick film by extrusion. Measured on this film were a WVP2 of 2154 g/m² 0.24 hr and a waterproofness of 429 ml/m² 0.24 hr. The permanent plastic deformation after one elongation to 100% was 20% at a breaking strength of 71 and an elongation at break of 414%.

EXAMPLE IX

In a manner analogous to that indicated in Example VIII a copolyether amide was prepared, except that the weight percentages of Jeffamine ED2001 and Jeffamine D2000 in the copolyether amide corresponded to 25 wt. % and 15 wt. %, respectively. The content of ethylene oxide groups in the copolyether amide was 24.5 wt. %.

The thus obtained copolyether amide was made into a 22 μm thick film by extrusion, on which a WVP1 of 1916 g/m² 0.24 hr was measured by ASTM 96-66 (method B) at 30° C. and 50% RH.

In the following table the outcome of this measurement is compared with WVP1 measurements on films of copolyether amides according to Examples I and VIII.

TABLE 4

| Polymer example | Jeffamine ED2001 wt. % | Jeffamine D2000 wt. % | EO wt. % | WVPI g/m² · 24 hr | film thickness μm |
|---|---|---|---|---|---|
| VIII | 15 | 25 | 14 | 1533 | 23 |
| I | 20 | 20 | 20.5 | 1775 | 18 |
| IX | 25 | 15 | 24.5 | 1916 | 22 |

It is clear from the data listed in Table 4 that the WVP increases with the increasing weight percentage of ethylene oxide groups.

EXAMPLE X

In a manner analogous to that indicated in Example I a copolyether amide was prepared, except that this time use was made of 4000 g of water, 2525 g of Jeffamine ED2001 having a molecular weight of about 2000, 2424 g of C36 dimeric acid (PRIPOL 1009, ex Unichema), 381.9 g of hexamethylene diamine, 5000 g of ε-caprolactam, 50 g of Irganox 1330 (ex Ciba Geigy), and 26.7 g of 85% phosphoric acid. The autoclave was heated to 200° C. under an atmosphere of nitrogen and kept at this temperature for 2 hours at a pressure of 18 bar. Next, there was further heating at this pressure for 1.5 hours at 250° C. After relieving pressure for 80 minutes the polycondensation reaction was continued for another 3 hours. The thus obtained product was extruded, cooled in water, and chopped up into a granulate, which was then washed for 3 hours with water of 90–95° C. and dried. The resulting copolymer had an $\eta_{rel}$ of 2.78 and melted at 195° C. The water absorption was 49 wt. %. The composition of the copolyether amide was determined by NMR to be 45.6 wt. % of polyamide-6, 22.4 wt. % of ethylene oxide groups, and 32 wt. % of the salt of C36-dimeric fatty acid and hexamethylene diamine (PA/36). After the addition of 1 wt. % of microtalc the thus obtained copolymer was extruded to form a 49 μm thick film. The WVP1 of the obtained elastic film was 2350 g/m² 0.24 hr. The water permeability was 1350 ml/m² 0.24 hr.

EXAMPLE XI

In a manner analogous to that indicated in Example III a copolyether amide was prepared, except that this time instead of adipic acid, C44-dimeric acid was employed as chain extender.

In the preparation use was made of a mixture of 187.5 g of Jeffamine ED2001 and 187.5 g of Jeffamine D2000, 375 g of ε-caprolactam, 121.53 g of dimeric fatty acid (PRIPOL 1004, ex Unichema), 3.5 g of the heat stabiliser Irganox 1330 (ex Ciba Geigy), 2.0 g of 85% phosphoric acid, and 10 g of water. This mixture was subjected to a polycondensation reaction in a batch autoclave for 5 hours at 230° to 235° C. under a nitrogen atmosphere. The resulting product was cooled down rapidly in water and chopped up into a granulate. This was then washed with water for 3 hours at 90° C. Following drying a relative viscosity of 2.15 was measured. The polymer melted (DSC) at 217° C. According to NMR analysis, the polymer contained about 26 wt. % of polypropylene oxide, 20 wt. % of polyethylene oxide, 20 wt. % of C44-dimeric acid, and 34 wt. % of polyamide-6 segments. The water absorption of the polymer was 55 wt. %. A strong and elastic film could be obtained by means of melt moulding.

EXAMPLE XII

In a manner analogous to that indicated in Example I a copolyether amide was prepared, except that this time use was made of a mixture of 1996.9 g of Jeffamine ED4000, a polyethylene oxide having an average molecular weight of 4000 g/mole (ex Huntsman Corporation), 1987.9 g of Jeffamine D2000, 6000 g of caprolactam, 211.75 g of adipic acid, 50 g of Irganox 1330, 25 g of 85% phosphoric acid, and 100 g of silica (Sylobloc ex Grace) dispersed in 500 g of water. The polymerisation was carried out under nitrogen at 250° C. and took 8 hours and 10 minutes. The washed and dried granulate had an $\eta_{rel}$ of 2.43. The weight percentage of polyether amide was determined by NMR to be 56. The weight percentages of ethylene oxide (EO) groups and propylene oxide (PO) groups were determined to be 20 and 24, respectively. The polymer had a melting point of 210° C. The water absorption was 55 wt. %. A 16 $\mu$m extruded film had a WVP2 of 2766 g/m$^2$ 24 hr and a waterproofness of 1134 ml/m$^2$ 24 hr. The permanent plastic deformation after one elongation to 100% was 28.5% at a breaking strength of 50 MPa and an elongation at break of 400%.

EXAMPLE XIII

In a manner analogous to that indicated in Example III a copolyether amide was prepared, except that this time use was made of a mixture of 12.5 kg of Jeffamine ED2003, a polyethylene oxide having an average molecular weight of 2000 g/mole with a lower monoamine content than Jeffamine ED2001 (ex Huntsman Corporation), 12.5 kg of Jeffamine D2000, 25 kg of caprolactam, 1749.8 g of adipic acid, 250 g of Irganox 1330, 125 g of 85% phosphoric acid, and 500 g of "IT extra" microtalc dispersed in 2.5 l of water. The polymerisation was carried out under nitrogen and took 7 hours and 22 minutes. The washed and dried granulate had an $\eta_{rel}$ of 2.60 and a melting point of 209° C. NMR was used to determine a polyether amide weight percentage of 46. The weight percentages of ethylene oxide (EO) groups and propylene oxide (PO) groups were determined to be 24 and 30, respectively. The water absorption was 75 wt. %.

EXAMPLE XIV

In a manner analogous to that indicated in Example I a copolyether amide was prepared, except that this time use was made of 150 g of Jeffamine ED2001, 150 g of bis-(3-aminopropyl)polytetrahydrofuran 2100 (PTHF-diamine, ex BASF), 450 g of caprolactam, 20.05 g of adipic acid, 3.75 g of Irganox 1330, and 2.0 g of 85% phosphoric acid. The polymerisation reaction was carried out in a 2 l glass reactor under a nitrogen atmosphere at 240° C. and took 7 hours and 25 minutes. The washed and dried granulate had an $\eta_{rel}$ of 2.50 and a melting point of 213° C. The weight percentage of polyether amide was determined by NMR to be 58. The weight percentages of ethylene oxide (EO) groups and PTHF were determined to be 19 and 23, respectively. The polymer had a water absorption of 39 wt. %. A 17.8 $\mu$m thick extruded film had a WVP2 of 2915 g/m$^2$ 24 hr. The waterproofness was 580 ml/m$^2$ 24 hr. The permanent plastic deformation after one elongation to 100% was 30.3% at a breaking strength of 66 MPa and an elongation at break of 580%.

EXAMPLE XV

In a manner analogous to that indicated in Example III a copolyether amide was prepared, except that this time use was made of 187.5 g of Jeffamine ED2001, 187.5 g of bis-(3-aminopropyl)polytetrahydrofuran 2100 (PTHF-diamine, ex BASF), 375 g of caprolactam, 24.84 g of adipic acid, 3.75 g of Irganox 1330, and 2.0 g of 85% phosphoric acid. The polymerisation reaction was carried out in a 2 l glass reactor under a nitrogen atmosphere at 240° C. and took 7 hours and 25 minutes. The washed and dried granulate had an $\eta_{rel}$ of 2.41 and a melting point of 208° C. NMR was used to determine a polyether amide weight percentage of 45. The weight percentages of ethylene oxide (EO) groups and PTHF were determined to be 25 and 30, respectively. The water absorption of the polymer was 55 wt. %. A 11.8 $\mu$m extruded film had a WVP2 of 3100 g/m$^2$ 24 hr. The permanent plastic deformation after one elongation to 100% was 20.1% at a breaking strength of 32 MPa and an elongation at break of 460%.

EXAMPLE XVI

A film of a polyether amide was obtained in a manner analogous to that described in EP-A-0665 259. A polyether amide prepared in a manner analogous to that of Example III, having the same composition as the polymer in Example III and a relative viscosity of 2.49, a melting point of 212° C., and a water absorption of 74 wt. % was dissolved in N-methyl pyrrolidone (NMP) at 140° C. under nitrogen to a 5 wt. % solution. This solution was poured into a threefold excess of water with vigorous stirring. The resulting dispersion was centrifuged at 3000 rpm, after which the supernatant liquid was decanted. The sediment was again dispersed in water and the aforesaid procedure was repeated three times, resulting in an aqueous dispersion having a solids content of about 2.5% and an average particle size of about 2 $\mu$m.

This viscous dispersion was filtered and then spread with a knife on a flat Teflon substrate and dried in air at 22° C. and 65% relative humidity, followed by a 10-minute treatment in a drying oven at 195° C. The 19 $\mu$m thick film thus obtained had a WVP2 of 2932 g/m$^2$ 24 hr and a waterproofness of 866 ml/m$^2$ 24 hr. The film had a breaking strength of 20.0 MPa at an elongation at break of 289%.

I claim:

1. A vapor permeable and waterproof article of manufacture selected from the group consisting of rainwear, a tent, a chair cover, a shoe, a mattress cover, underslating for a roofing structure, a medical purpose garment, and a dressing, which contains a non-porous, waterproof film having a water vapour permeability of at least 1000 g/m$^2$ day determined at 30° C. and 50% RH in accordance with ASTM E96-66 made from a copolyether amide composed of polyamide segments A and ethylene oxide groups-containing polyamide segments B, the polyamide segments A comprising monomer units of the following structure:

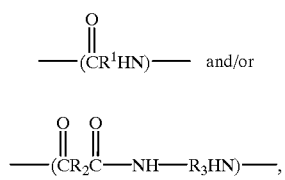
(I)

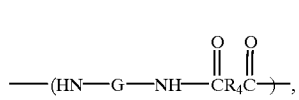
(II)

wherein $R_1$ has the meaning of an alkylene group with 3 to 11 carbon atoms which may be substituted or not, and $R_2$ and $R_3$ may be the same or different and represent a (cyclo)alkylene group with 4 to 11 carbon atoms which may be substituted or not or a difunctional aromatic group, and the polyamide segments B comprising monomer units of the following structure:

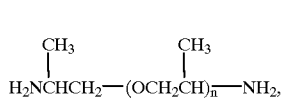
(III)

wherein G stands for a divalent group remaining after the removal of the amino terminated groups of a polyoxyalkylene diamine which is connected or not via one or more lactam units included among the polyamide segments A according to the former formula with a dicarboxylic acid unit wherein R4 has the meaning of a (cyclo)alkylene group which may be substituted or not, a polyoxyalkylene group or a difunctional aromatic group, characterised in that the copolyether amide a) is made up of at least 10 wt. % and not more than 30 wt. % of ethylene oxide groups, b) is composed of 30 to 60 wt. % of polyamide segments A and 70 to 40 wt. % of polyamide segments B containing the monomer units according to formula (III), wherein G has the meaning of a polyoxyalkylene group having a molecular weight of 600 to 6000 and an atomic ratio of carbon to oxygen of 2.0 to 4.3, or when the group $R_4$ has the meaning of a divalent group obtained after the removal of the carboxyl groups, of a dimeric fatty acid or of a polyoxyalkylene group having a molecular weight of 600 to 6000 and an atomic ratio of carbon to oxygen of 2.0 to 4.3, as well as of a (cyclo)alkylene group with 2 to 12 carbon atoms which may be substituted or not or of a difunctional aromatic group, and has a melting point in the range of 180° to 260° C.

2. An article of manufacture as claimed in claim 1, characterised in that the melting point of the copolyether amide is in the range of 190° C. to 240° C.

3. An article of manufacture as claimed in claim 1, characterised in that the percentage of ethylene oxide is in the range of 15 wt. %. to 25 wt. %.

4. An article of manufacture as claimed in claim 1, characterised in that the concentration of the polyamide segments A in the copolyether amide is in the range of 40 wt. %. to 50 wt. %.

5. An article of manufacture as claimed in claim 1, characterised in that the molecular weight of group G is in the range of 1000 to 4000.

6. An article of manufacture as claimed in claim 1, characterised in that the polyether amide segments B are composed of a diamine of the formula:

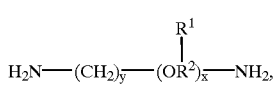
(IV)

wherein x is an integer from 1 to 100, y is an integer from 1 to 20, $R_1$ has the meaning of a hydrogen atom or an alkyl group with 1 to 4 carbon atoms, and $R_2$ has the meaning of an alkylene group with 2 to 4 carbon atoms.

7. An article of manufacture as claimed in claim 1, characterised in that the polyether amide segments B are composed of a diamine of the formula:

$$H_2NCHCH_2-(OCH_2CH)_n-NH_2,$$ with $CH_3$ groups (V)

wherein n is 25 to 40 and/or a diamine of the formula:

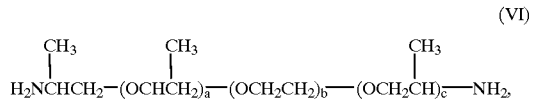
(VI)

wherein c stands for at least 1, (a+c) is at least 1, but less than 6, and b represents at least 10, but not more than 90.

8. An article of manufacture as claimed in claim 7, characterised in that in formula (V) n=30 to 40, and in formula (VI) a+c=1 to 6, and b=35 to 45.

9. An article of manufacture as claimed in claim 7, characterised in that in formula (V) n=±33, and in formula (VI) a+c=±5,5, and b=±37,5.

10. An article of manufacture as claimed in claim 1, characterised in that $R_4$ has the meaning of a tetramethylene or cyclohexylene group.

11. An article of manufacture as claimed in claim 1, characterised in that $R_4$ is derived from aliphatic dimeric carboxylic acid with 36 to 44 carbon atoms.

12. An article of manufacture as claimed in claim 1, characterised in that at least 50 wt. % of the polyamide segments A is made up of caprolactam.

13. An article of manufacture as claimed in claim 1, characterised in that at least 50 wt. % of the polyamide segments A is made up of polyamide-6,6.

14. An article of manufacture as claimed in any one of claims 1–13, characterised in that the water absorption does not exceed 75 wt. %, calculated on the weight of the dry films and determined at 23° C. in water in accordance with DIN 53495.

15. An article of manufacture as claimed in any one of claims 1–13, characterised in that the water absorption does not exceed 55 wt. %, calculated on the weight of the dry films and determined at 23° C. in water in accordance with DIN 53495.

* * * * *

UNITED STATES PATENT AND TRADEMARK OFFICE
CERTIFICATE OF CORRECTION

PATENT NO. : 5,989,697
DATED : November 23, 1999
INVENTOR(S) : Bert GEBBEN

It is certified that error appears in the above-indentified patent and that said Letters Patent is hereby corrected as shown below:

Column 4, line 59, change "c-aminocaproic" to --ε-aminocaproic--; and

Column 13, line 5, change "-(CR¹HN)-" to -- -(CR₁HN)- --.

Signed and Sealed this

Eleventh Day of July, 2000

Attest:

Q. TODD DICKINSON

*Attesting Officer*  *Director of Patents and Trademarks*